(12) United States Patent
Wade (10) Patent No.: US 10,781,339 B2
(45) Date of Patent: Sep. 22, 2020

(54) REDUCED DISCOLORATION OF POLYASPARTIC RESINS BLENDED WITH ACRYLATE RESINS

(71) Applicant: COVESTRO LLC, Pittsburgh, PA (US)

(72) Inventor: Robert Wade, Oakdale, PA (US)

(73) Assignee: Covestro LLC, Pittsburgh, PA (US)

( * ) Notice: Subject to any disclaimer, the term of this patent is extended or adjusted under 35 U.S.C. 154(b) by 43 days.

(21) Appl. No.: 16/129,926

(22) Filed: Sep. 13, 2018

(65) Prior Publication Data

US 2020/0087536 A1    Mar. 19, 2020

(51) Int. Cl.
| | | |
|---|---|---|
| C09D 177/04 | (2006.01) | |
| C09D 7/65 | (2018.01) | |
| C09D 7/63 | (2018.01) | |
| C09D 179/08 | (2006.01) | |
| C08K 5/07 | (2006.01) | |
| C08L 75/04 | (2006.01) | |
| C08L 79/08 | (2006.01) | |

(52) U.S. Cl.
CPC ............ *C09D 177/04* (2013.01); *C09D 7/63* (2018.01); *C09D 7/65* (2018.01); *C09D 179/08* (2013.01); *C08K 5/07* (2013.01); *C08L 75/04* (2013.01); *C08L 79/08* (2013.01)

(58) Field of Classification Search
CPC .......... C09D 7/93; C09D 7/95; C09D 177/04; C09D 179/08; C08K 5/07; C08L 74/04; C08L 75/08
See application file for complete search history.

(56) References Cited

U.S. PATENT DOCUMENTS

| | | |
|---|---|---|
| 3,316,592 A | 5/1967 | Forrest |
| 3,704,098 A | 11/1972 | Smith et al. |
| 4,206,205 A | 6/1980 | Mrozik et al. |
| 5,126,170 A | 6/1992 | Zwiener et al. |
| 5,236,741 A | 8/1993 | Zwiener et al. |
| 5,243,012 A | 9/1993 | Wicks et al. |
| 5,489,704 A | 2/1996 | Squiller et al. |
| 5,736,604 A | 4/1998 | Luthra |
| 6,107,436 A | 8/2000 | Goeb et al. |
| 6,458,293 B1 | 10/2002 | Roesler et al. |
| 6,833,424 B2 | 12/2004 | Milhem |
| 7,169,876 B2 | 1/2007 | Asher |
| 2005/0032947 A1 | 2/2005 | Takahashi et al. |
| 2006/0247371 A1 | 11/2006 | Mundstock et al. |
| 2009/0082499 A1* | 3/2009 | Nishida ............... C08J 5/18 524/195 |
| 2014/0094566 A1* | 4/2014 | Garbe ............... C08G 18/672 524/874 |
| 2018/0362801 A1* | 12/2018 | Wade ............... C08G 18/73 |

FOREIGN PATENT DOCUMENTS

DE    4040290 A    7/1992

OTHER PUBLICATIONS

UV & EB Curing Formulations for Printing Inks, Coatings & Paints, ed. R. Holman and P. Oldring, published by SITA Technology, London (England), 1988, pp. 36 et seq.
"Chemistry & Technology of UV & EB Formulations for Coatings, Inks & Paints", vol. 1, P K T Oldring (Ed.), SITA Technology, London, England, pp. 101-157, 1991.

* cited by examiner

*Primary Examiner* — Sanza L. McClendon
(74) *Attorney, Agent, or Firm* — Jed C. Benson; John E. Mrozinksi, Jr.

(57) ABSTRACT

The present invention provides a coating composition comprising: 1% to 99% of a blend of two or more aspartic ester functional amines; 20% to 70% of an acrylate-containing compound; 0.01% to 5% of an alkyl carbodiimide; 0.1% to 5% of a photoinitiator; and 20% to 70% of one or more polyisocyanates, wherein the composition has reduced discoloration compared to the composition without the alkyl carbodiimide. The ready-to-apply coating produced from this composition may find use on substrates such as countertops and floors.

25 Claims, 2 Drawing Sheets

REDUCED DISCOLORATION OF POLYASPARTIC RESINS BLENDED WITH ACRYLATE RESINS

FIELD OF THE INVENTION

The present invention relates in general, to coatings, and more specifically, to coating compositions containing amino-functional polyaspartates blended with acrylate-containing compounds, which exhibit reduced discoloration upon aging.

BACKGROUND OF THE INVENTION

As those skilled in the art are aware, polyaspartate coatings have the advantages of fast cure times and therefore fast return to service; a high film build in one coat; good chemical and solvent resistance; good abrasion resistance; and the coatings are non-yellowing. A further advantage is that a 100% solids coating is possible with polyaspartate coatings. Unfortunately, polyaspartate coatings have the disadvantage of a short (less than 30 minutes) working time and a high viscosity.

On the other hand, UV-cured coatings have the advantages of fast cure times and therefore fast return to service; a high film build in one coat; excellent chemical and solvent resistance; good abrasion resistance; and are also non-yellowing. Further advantages of UV-cured coatings are that a 100% solids coating is possible; along with an unlimited working time and low viscosity. UV-cured coatings have the disadvantages of no physical drying and the potential for so-called "zipper" lines caused by UV-curing equipment.

A commonly-owned patent application U.S. Ser. No. 15/626,267, filed Jun. 19, 2017, is directed to a coating composition which reduces or eliminates the disadvantages of each system and avoids formation of zipper lines; however, the liquid resin composition described therein appears to experience discoloration (i.e., yellowing) upon aging. This can result in an applicator opening a stored container of the discolored coating composition and assuming that the applied coating will also have a tint to it. Additionally, if the coating composition is applied to a white substrate, an observer may notice a slight cast.

To reduce this discoloration, therefore, a need exists in the art for a polyaspartate/UV-cured coating which will retain the advantages of each system but which exhibits reduced discoloration upon aging.

SUMMARY OF THE INVENTION

Accordingly, the present invention provides a polyaspartate/UV-cured coating composition which will retain the advantages of each system but which exhibits reduced discoloration upon aging.

The coating composition comprises a combination of an aspartic ester functional amine and acrylate-containing compounds which can be blended to produce 100% solids, low viscosity materials. The blend is mixed with one or more polyisocyanates to produce ready-to-apply coatings with extended working times. The present inventor has surprisingly found that the inclusion of 0.01% to 5% of an alkyl carbodiimide in the blend reduces discoloration, such as yellowing, of the coating composition upon aging. In addition to the NCO/NH reaction, a photoinitiator such as an aspartic ester functional amine is added to the blend to provide a free radical reaction when exposed to UV light.

It is understood that the invention disclosed and described in this specification is not limited to the embodiments summarized in this Summary. These and other advantages and benefits of the present invention will be apparent from the Detailed Description of the Invention herein below.

BRIEF DESCRIPTION OF THE FIGURES

The present invention will now be described for purposes of illustration and not limitation in conjunction with the figures, wherein.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about."

Any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a), and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," "certain embodiments," or the like, means that a particular feature or characteristic may be included in an embodiment. Thus, use of the phrase "in various non-limiting embodiments," "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various or certain embodiments may be combined, in whole or in part, with the features or characteristics of one or more other embodiments without limitation. Such modifications and variations are intended to be included within the scope of the present specification.

The grammatical articles "a", "an", and "the", as used herein, are intended to include "at least one" or "one or more", unless otherwise indicated, even if "at least one" or "one or more" is expressly used in certain instances. Thus, these articles are used in this specification to refer to one or more than one (i.e., to "at least one") of the grammatical objects of the article. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

The present inventor has surprisingly discovered that the presence of an alkyl carbodiimide, preferably a dialkyl carbodiimide, in the polyacrylate blend component of a coating composition, reduces discoloration observed in the coating composition upon aging when compared with the same composition not containing the alkyl carbodiimide.

In a first aspect, the present invention is directed to a coating composition comprising: 1% to 99% of a blend of two or more aspartic ester functional amines; 20% to 70% of an acrylate-containing compound; 0.01% to 5% of an alkyl carbodiimide; 0.1% to 5% of a photoinitiator; and 20% to 70% of one or more polyisocyanates, wherein the coating composition has reduced discoloration compared to the composition without the alkyl carbodiimide.

In another aspect, the present invention is directed to a cured coating produced by exposing to actinic radiation a coating composition comprising 1% to 99% of a blend of two or more aspartic ester functional amines; 20% to 70% of an acrylate-containing compound; 0.01% to 5% of an alkyl carbodiimide; 0.1% to 5% of a photoinitiator; and 20% to 70% of one or more polyisocyanates, wherein the coating composition has reduced discoloration compared to the composition without the alkyl carbodiimide.

In a further aspect, the present invention is directed to a substrate coated with a coating composition comprising: 1% to 99% of a blend of two or more aspartic ester functional amines; 20% to 70% of an acrylate-containing compound; 0.01% to 5% of an alkyl carbodiimide; 0.1% to 5% of a photoinitiator; and 20% to 70% of one or more polyisocyanates, wherein the coating composition has reduced discoloration compared to the composition without the alkyl carbodiimide. Such substrates may include, but are not limited to, countertops and floors.

In yet a further aspect, the present invention is directed to a process of reducing discoloration of a coating composition comprising adding an alkyl carbodiimide to the composition.

In a still further aspect, the present invention is directed to a process of reducing discoloration of a coating composition comprising adding 0.01% to 5% of an alkyl carbodiimide to the composition, wherein the composition comprises 1% to 99% of a blend of two or more aspartic ester functional amines; 20% to 70% of an acrylate-containing compound; 0.1% to 5% of a photoinitiator; and 20% to 70% of one or more polyisocyanates.

As used herein, the term, "formulation" refers to a mixture prepared according to a particular formula.

As used herein, the term "coating composition" refers to a mixture of chemical components that will cure and form a coating when applied to a substrate.

As used herein, a "coating" means a layer of any substance spread over at least a portion of a surface (substrate).

"Cured," "cured composition" or "cured compound" refers to components and mixtures obtained from reactive curable original compound(s) or mixture(s) thereof which have undergone chemical and/or physical changes such that the original compound(s) or mixture(s) is(are) transformed into a solid, substantially non-flowing material. A typical curing process may involve crosslinking.

The term "curable" means that an original compound(s) or composition material(s) can be transformed into a solid, substantially non-flowing material by means of chemical reaction, crosslinking, radiation crosslinking, or the like. Thus, compositions of the invention are curable, but unless otherwise specified, the original compound(s) or composition material(s) or formulations is(are) not cured.

As used herein, the term "discoloration" means to take on a cast or a colored tint, typically over time. Discoloration as used herein can refer to any color.

The term "yellowing" as used herein, means to take on a yellow cast or tint.

As used herein, the term "polyisocyanate" refers to compounds comprising at least two free isocyanate groups. Polyisocyanates include diisocyanates and diisocyanate reaction products comprising, for example, biuret, isocyanurate, uretdione, urethane, urea, iminooxadiazine dione, oxadiazine trione, carbodiimide, acyl urea, and/or allophanate groups.

The polyisocyanate suitable for inclusion in the coating compositions of the present invention are in various embodiments, aromatic, araliphatic, aliphatic or cycloaliphatic di- and/or polyisocyanates and mixtures of such isocyanates. Preferred are diisocyanates of the formula:

wherein $R^1$ represents an aliphatic hydrocarbon residue having 4 to 12 carbon atoms, a cycloaliphatic hydrocarbon residue having 6 to 15 carbon atoms, an aromatic hydrocarbon residue having 6 to 15 carbon atoms or an araliphatic hydrocarbon residue having 7 to 15 carbon atoms.

Specific examples of suitable isocyanates include, but are not limited to, ethylene diisocyanate; 1,4-tetramethylene diisocyanate, 1,6-hexamethylene diisocyanate (HDI), pentamethylene diisocyanate (PDI), isophorone diisocyanate (IPDI), 2,2,4- and 2,4,4-trimethyl-hexamethylene diisocyanate, the isomeric bis-(4,4'-isocyanatocyclohexyl)methanes or mixtures thereof of any desired isomer content, benzene diisocyanate; 1,4-cyclohexylene diisocyanate, 1,12-dodecamethylene diisocyanate, 1,4-phenylene diisocyanate, 2,4- and/or 2,6-toluene diisocyanate (TDI) or hydrogenated 2,4- and/or 2,6-toluene diisocyanate, 1,5-naphthalene diisocyanate, 2,4'- and 4,4'-diphenylmethane diisocyanate (MDI), 1,3- and 1,4-bis-(2-isocyanato-prop-2-yl)-benzene (TMXDI), 1,3-bis(isocyanato-methyl)benzene (XDI), bis-(4-isocyanato-cyclohexyl)methane ($H_{12}$MDI), (S)-alkyl 2,6-diisocyanato-hexanoates or (L)-alkyl 2,6-diisocyanato-hexanoates. In various embodiments, the polyisocyanate component may comprise a triisocyanate, such as, for example, 4-isocyanatomethyl-1,8-octane diisocyanate (triisocyanatononane or TIN); isomers thereof; or derivatives thereof.

Polyisocyanates having isocyanurate, biuret, allophanate, uretdione or carbodiimide groups are also useful as the isocyanate component of the present invention. Such polyisocyanates may have isocyanate functionalities of three or more and are prepared by the trimerization or oligomerization of diisocyanates or by the reaction of diisocyanates with polyfunctional compounds containing hydroxyl or amine groups. Preferred is the isocyanurate of hexamethylene diisocyanate. Further suitable compounds are blocked polyisocyanates, such as 1,3,5-tris-[6-(1-methyl-propylidene aminoxy carbonylamino)hexyl]-2,4,6-trioxo-hexahydro-1,3,5-triazine.

The terms "aspartic ester functional amine", "aminofunctional polyaspartate" and "polyaspartate" are used interchangeably in the present disclosure. Various embodiments of the coating compositions of the present invention include 1% to 99% of a blend of two or more aspartic ester functional amines and other embodiments include 20% to 70%, based on the weight of total composition. Aspartic ester functional amines useful in the coating compositions of the present invention are described in U.S. Pat. Nos. 5,126,170; 5,236,741; and 5,489,704, all incorporated herein by reference. These polyaspartates comprise compounds of formula (I):

In compounds of formula (I), the residue X is preferably obtained from an n-valent polyamine selected from ethylenediamine, 1,2-diaminopropane, 1,4-diaminobutane, 1,6-diaminohexane, 2,5-diamino-2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 2,4- and/or 2,6-hexahydrotoluylenediamine, 2,4'- and/or 4,4'-diaminodicyclohexylmethane, 3,3'-dimethyl-4,4'-diaminodicyclohexylmethane, 2,4,4'-triamino-5-methyldicyclohexylmethane, and polyether polyamines with aliphatically bound primary amino groups and having a number average molecular weight, Mn, of 148 to 6000 g/mol where the number average molecular weight is determined according to ASTM D 3750-79, (1985).

The residue X is more preferably obtained from 1,4-diaminobutane, 1,6-diaminohexane, 2,2,4- and/or 2,4,4-trimethyl-1,6-diaminohexane, 1-amino-3,3,5-trimethyl-5-aminomethylcyclohexane, 4,4'-diaminodicyclohexylmethane or 3,3'-dimethyl-4,4'-diaminodicyclohexylmethane.

The phrase "inert to isocyanate groups under the reaction conditions," which is used to define groups $R^1$ and $R^2$, means that these groups do not have Zerevitinov-active hydrogens (CH-acid compounds; cf. *Römpp Chemie Lexikon*, Georg Thieme Verlag Stuttgart), such as OH, NH or SH.

$R^1$ and $R^2$, independently of one another, are in some embodiments $C_1$ to $C_{10}$ alkyl residues, in certain embodiments methyl or ethyl residues. Where X is the residue obtained from 2,4,4'-triamino-5-methyldicyclohexylmethane, $R^1$ and $R^2$ are preferably ethyl. $R^3$ and $R^4$ may be identical or different and represent hydrogen or organic groups which are inert towards isocyanate groups at a temperature of 100° C. or less, in some embodiments hydrogen or $C_1$ to $C_{10}$ alkyl residues, in certain embodiments hydrogen, methyl or ethyl residues. In some embodiments, $R^3$ and $R^4$ are both hydrogen. In formula I), n is in some embodiments an integer from 2 to 6, in other embodiments 2 to 4.

The production of aspartic ester functional amines takes place in known manner by reacting the corresponding primary polyamines of the formula (II):

with maleic or fumaric acid esters of the formula (III):

where $R^1$, $R^2$, $R^3$ and $R^4$ are as defined above for formula (I).

Suitable polyamines are the above-mentioned diamines or triamines (examples include JEFFAMINE T-403 and NTA). Examples of suitable maleic or fumaric acid esters are dimethyl maleate, diethyl maleate, dibutyl maleate, and the corresponding fumarates.

In various embodiments, the production of aspartic ester functional amines from the above-mentioned starting materials takes place within the temperature range of 0° C. to 100° C. The starting materials are used in amounts such that there is at least one, preferably one, olefinic double bond for each primary amino group. Any starting materials used in excess can be separated off by distillation following the reaction. The reaction can take place in the presence or absence of suitable solvents, such as methanol, ethanol, propanol, dioxane, or mixtures thereof.

Suitable aspartic ester functional amines for use in the coating compositions of the present invention include those described in U.S. Pat. Nos. 5,126,170; 5,236,741; 5,489,704; 5,243,012; 5,736,604; 6,458,293; 6,833,424; 7,169,876; and in U.S. Patent Publication No. 2006/0247371, which are incorporated by reference into this specification. Suitable aspartic ester functional amines are commercially available from Covestro LLC, under the names DESMOPHEN NH 1220, DESMOPHEN NH 1420, DESMOPHEN NH 1520, DESMOPHEN NH 1521, DESMOPHEN NH 2850 XP.

The coating compositions of the present invention include one or more acrylate-containing compounds. In various embodiments, the coating compositions include 1% to 99% of the acrylate-containing compound and in certain other embodiments 20% to 70% of the acrylate-containing compound are included based on the weight of total composition. The acrylate-containing compound useful in the coating compositions of the present invention are polycondensation products derived from polycarboxylic acids or the anhydrides thereof (such as, for example, adipic acid, sebacic acid maleic anhydride, fumaric acid and phthalic acid), di- and/or more highly functional polyols (such as for example ethylene glycol, propylene glycol, neopentyl glycol, trimethylol-propane, pentaerythritol, alkoxylated di- or polyols and the like), and acrylic and/or methacrylic acid. After polycondensation, excess carboxyl groups may be reacted with epoxides.

Production of the acrylate-containing compound is described in U.S. Pat. No. 4,206,205, German Offenlegungsschrifften U.S. Pat. Nos. 4,040,290, 3,316,592, and 3,704, 098 and in *UV & EB Curing Formulations for Printing Inks*, Coatings & Paints, ed. R. Holman and P. Oldring, published by SITA Technology, London (England), 1988, pages 36 et seq. The reactions should be terminated once the OH number is within the range from 40 to 240. It is also possible to use polyepoxy acrylate polymers containing hydroxyl groups or polyurethane acrylate polymers containing hydroxyl groups. In various embodiments, the percentage of C=C can range from 0.1 moles/kg to 10 moles/kg, based on the weight of the acrylate polymer(s).

Suitable acrylate-containing compounds include all those described herein below, in connection with urethane acrylates and acrylate-functional polyisocyanates. Suitable acrylate-functional compounds can also have epoxy groups, an example of which is glycidyl(meth)acrylate, or the reaction products of equimolar amounts of acrylic or metacrylic acid and die oxide compounds, such as, for example, neopentylglycol diglycidyl ester. Reaction products of hydroxyl-containing, polymerizable monomers, such as, for example, hydroxyethyl acrylate, and diepoxides are also suitable. Acrylate-containing compounds are available from a variety of suppliers, such as Sartomer and Allnex USA Inc. The acrylate-containing compounds useful in the present invention may be monomeric or oligomeric.

The coating compositions of the present invention further include initiators of a free-radical polymerization, which can be activated thermally and/or by radiation. Photoinitiators, which are activated by UV or visible light, are preferred in this context. Photoinitiators are compounds known in the art, being sold commercially, a distinction being made between unimolecular (type I) and bimolecular (type II) initiators. Suitable (type I) systems are aromatic ketone compounds, e.g. benzophenones in combination with tertiary amines, alkylbenzophenones, 4,4'-bis(dimethylamino)benzophenone (Michler's ketone), anthrone and halogenated benzophenones or mixtures of the types stated. Of further suitability are (type II) initiators such as benzoin and its derivatives, benzil ketals, acylphosphine oxides, 2,4,6-trimethylbenzoyldiphenylphosphine oxide for example, bisacylphosphine oxides, phenylglyoxylic esters, camphorquinone, α-aminoalkylphenones, α,α-dialkoxyacetophenones, and α-hydroxyalkylphenones.

The initiators, which are used in amounts between 0.1% and 10% by weight in some embodiments and 0.1% to 5% by weight in other embodiments, all percentages based on the weight of the acrylate(s), can be used as an individual substance or, on account of frequent advantageous synergistic effects, in combination with one another.

Where electron beams-are used instead of UV radiation there is no need for a photoinitiator. Electron beams, as is known to the skilled person, are generated by means of thermal emission and accelerated by way of a potential difference. The high-energy electrons then pass through a titanium foil and are guided onto the binders to be cured. The general principles of electron beam curing are described in detail in "Chemistry & Technology of UV & EB Formulations for Coatings, Inks & Paints", Vol. 1, P K T Oldring (Ed.), SITA Technology, London, England, pp. 101-157, 1991.

In the event of thermal curing of the activated double bonds, this can also take place with addition of thermally decomposing free-radical initiators. Suitability is possessed, as is known to the skilled person, by, for example, peroxy compounds such as dialkoxy dicarbonates such as, for example, bis(4-tert-butylcyclohexyl)-peroxydicarbonate, dialkyl peroxides such as, for example, dilauryl peroxide, peresters of aromatic or aliphatic acids such as, for example, tert-butyl perbenzoate or tert-amyl peroxy 2-ethylhexanoate, inorganic peroxides such as, for example, ammonium peroxodisulphate, potassium peroxodisulphate, organic peroxides such as, for example, 2,2-bis(tert-butylperoxy)butane, dicumyl peroxide, tert-butyl hydroperoxide or else azo compounds such as 2,2'-azobis[N-(2-propenyl)-2-methylpropionamides], 1-[(cyano-1-methylethyl)azo]formamides, 2,2'-azobis(N-butyl-2-methylpropionamides), 2,2'-azobis(N-cyclohexyl-2-methylpropionamides), 2,2'-azobis{2-methyl-N-[2-(1-hydroxybutyl)]propionamides}, 2,2'-azobis{2-methyl-N-[2-(1-hydroxybutyl)]propionamides, 2,2'-azobis{2-methyl-N-[1,1-bis(hydroxyl-methyl)-2-hydroxyethyl]propionamides. Also possible are highly substituted 1,2-diphenylethanes(benzpinacols), such as, for example, 3,4-dimethyl-3,4-diphenylhexane, 1,1,2,2-tetraphenylethane-1,2-diol or else the silylated derivatives thereof.

It is also possible to use a combination of initiators activable by UV light and thermally. The photoinitiator can be substantially any photoinitiator which preferably have a high photochemical reactivity and an absorption band in the near-UV range (>300 nm and particularly preferably >350 nm). A variety of photoinitiators can be utilized in the radiation-curing compositions of the present invention. The usual photoinitiators are those that generate free radicals upon exposure to radiation energy.

Suitable photoinitiators may be chosen from amongst acylphosphine oxide derivatives, α-aminoalkylphenone derivatives, hydroxyalkylphenones, benzophenones, benzil ketals, methylbenzoyl formate and phenyl-acetophenones. Further suitable compounds include, for example, 2,4,6-trimethylbenzoyldiphenylphosphine oxide, phenylglyoxylic acid esters, anthraquinone and the derivatives thereof, benzil ketals and hydroxyalkylphenones. Illustrative of additional suitable photoinitiators are 2,2-diethoxyacetophenone; 2- or 3- or 4-bromoacetophenone; 3- or 4-allyl-acetophenone; 2-acetonaphthone; benzaldehyde; benzoin; the alkyl benzoin ethers; benzophenone; benzoquinone; 1-chloroanthra-quinone; p-diacetyl-benzene; 9,10-dibromoanthracene; 9,10-dichloro-anthracene; 4,4-dichlorobenzophenone; thioxanthone; isopropyl-thioxanthone; methylthioxanthone; α,α,α-trichloro-para-t-butyl aceto-phenone; 4-methoxybenzophenone; 3-chloro-8-nonylxanthone; 3-iodo-7-methoxyxanthone; carbazole; 4-chloro-4'-benzyl-benzophenone; fluoroene; fluoroenone; 1,4-naphthylphenylketone; 1,3-pentanedione; 2,2-di-sec-butoxy acetophenone; dimethoxyphenyl acetophenone; propiophenone; isopropylthioxanthone; chlorothioxanthone; xanthone; maleimides and their derivatives; and mixtures thereof.

There are several suitable photoinitiators commercially available from Ciba including IRGACURE 184 (1-hydroxy-cyclohexyl-phenyl-ketone), IRGACURE 819 (bis(2,4,6-trimethyl-benzoyl)-phenylphosphineoxide), IRGACURE 1850 (a 50/50 mixture of bis(2,6-dimethoxybenzoyl)-2,4,4-trimethylpentyl-phosphine oxide and 1-hydroxy-cyclo-hexyl-phenyl-ketone), IRGACURE 500 (a 50/50 liquid mixture of 1-hydroxy-cyclohexyl-phenyl-ketone and benzophenone), IRGACURE 1700 (a 25/75 mixture of bis(2,6-dimethoxybenzoyl)-2,4,4-trimethylpentyl-phosphine oxide and 2-hydroxy-2-methyl-1-phenyl-propan-1-one), IRGACURE 907 (2-methyl-1[4-(methylthio)phenyl]-2-morpholonopropan-1-one), DAROCUR MBF (a phenyl glyoxylic acid methyl ester) and DAROCUR 4265 (a 50/50 mixture of bis(2,4,6-trimethylbenzoyl)-phenylphosphineoxide and 2-hydroxy-2-methyl-1-phenyl-propan-1-one). The foregoing lists are meant to be illustrative only and are not meant to exclude any suitable photoinitiators.

The present invention includes alkyl carbodiimide in coating compositions to reduce discoloration seen upon aging. Suitable alkyl carbodiimide include, but are not limited to, dialkyl carbodiimides, such as diisopropylcarbodiimides and dicyclohexyl carbodiimides. In various embodiments, the alkyl carbodiimide is present in the coating compositions of the present invention in an amount of from 0.01% to 10%, in other embodiments from 0.01% to 5%, in certain embodiments, 0.2%, all percentages based on the total weight of the blend of polyaspartates plus the acrylate(s).

As is known in the art and depending on the application for the coating, additional additives can be used. Such additives include, but are not limited to, emulsifiers, dispersing agents, flow aid agents, thickening agents, defoaming agents, de-aerating agents, pigments, fillers, flattening agents, and wetting agents.

Curing of the coating composition according to the invention is carried out by exposure to actinic radiation, preferably by exposure to high-energy radiation, i.e. UV radiation or daylight, e.g. light with a wavelength of 200 nm to 750 nm, or by bombardment with high-energy electrons (electron beams, 150 keV to 300 keV). Examples of radiation sources used for light or UV light include high-pressure mercury vapor lamps. It is possible for the mercury vapor to have been modified by doping with other elements such as gallium or iron.

Lasers, pulsed lamps (known under the designation UV flashlight lamps), halogen lamps or excimer emitters are also suitable. UV-A curing can be effected with a PANACOL UV-F 900 UV-A lamp from Panacol-Elosol GmbH, Germany. The lamps may be stationary so that the material to be irradiated is moved past the radiation source by means of a mechanical apparatus, or the lamps may be mobile and the material to be irradiated remains stationary in the course of curing. The radiation dose that is normally sufficient for crosslinking in the case of UV curing is 80 mJ/cm$^2$ to 5000 mJ/cm$^2$.

The nature and concentration of any initiator used are to be varied in known manner in accordance with the radiation dose and curing conditions. For applications that are cured with sunlight, photoinitiators that are activated by one or both of UV-A and visible light are preferred. The type and concentration of photoinitiator must be adapted, in a manner known to those skilled in the art, according to the radiation source used for curing.

Coatings made from the inventive coating compositions may find use in application to a variety of substrates including, but not limited to, floors and countertops.

EXAMPLES

The non-limiting and non-exhaustive examples that follow are intended to further describe various non-limiting and non-exhaustive embodiments described in this specification. All quantities given in "parts" and "percents" are understood to be by weight, unless otherwise indicated. The present invention is described in the context of reducing yellowing in the instant Examples. The present invention is not intended to be so limited and is applicable to reducing any discoloration in coating compositions.

The following materials were used in preparing the compositions of the Examples:

| | |
|---|---|
| POLYASPARTATE A | a 100% solids content aspartic ester functional amine, having an amine number of approx. 201 mg KOH/g, viscosity @ 250° C. of 1450 mPa · s, commercially available from Covestro LLC as DESMOPHEN NH 1420; |
| POLYASPARTATE B | a 100% solids content aspartic ester functional amine, having an amine number of approx. 191 mg KOH/g, viscosity @ 250° C. of 1400, commercially available from Covestro LLC as DESMOPHEN NH 1520; |
| POLYASPARTATE C | a 100% solids content aspartic ester functional amine, having an amine number of approx. 190 mg KOH/g, viscosity @ 250° C. of 100 mPa · s, commercially available from Covestro LLC as DESMOPHEN NH 2850 XP; |
| ISOCYANATE A | an aliphatic polyisocyanate resin based on hexamethylene diisocyanate, NCO content 23.5 ± 0.5%, viscosity 730 ± 100 mPa · s @ 23° C., commercially available from Covestro LLC as DESMODUR N-3900; |
| ADDITIVE A | a silicone and polymer-containing defoamer/air release additive, commercially available from BYK Chemie as BYK-530; |
| ADDITIVE B | a polyacrylate-based surface additive, commercially available from BYK Chemie as BYK-354; |
| ADDITIVE C | N,N-dicyclohexylcarbodiimide (DCC), commercially available from Acros Organics; |
| ADDITIVE D | a non-basic, low molecular weight, hindered amine light stabilizer (HALS), commercially available from Clariant as HOSTAVIN 3058; |
| ADDITIVE E | UV absorber of the hydroxyphenyl-benzotriazole class, commercially available from BASF Corporation as TINUVIN 1130; |
| ADDITIVE F | dibutylhydroxytoluene (BHT), commercially available from Aldrich; |
| PHOTOINTIATOR A | a 50:50 liquid mixture of two photoinitiators: 1-hydroxy-cyclohexyl-phenyl-ketone (IRGACURE 184) and benzophenone, commercially available from Ciba Specialty Chemicals as IRGACURE 500; |
| ACRYLATE A | 1,6 hexanediol diacrylate, commercially available from Sartomer as SR-238; |
| ACRYLATE B | trimethylolpropane triacrylate (TMPTA), commercially available from Sartomer as SR-351; |
| ACRYLATE C | an amine modified polyether acrylate having a functionality of 2.5 and a viscosity @ 25° C. of 100 mPa · s; commercially available from Allnex USA Inc. as EBECRYL 81; |
| ACRYLATE D | an amine modified polyether acrylate having a functionality of 3.3 and a viscosity @ 25° C. of 160 mPa · s, commercially available from Allnex USA Inc. as EBECRYL 85; |
| ACRYLATE E | a monoacrylate of ethoxylated phenol having an OH value of 15 mg KOH/g and a viscosity @ 25° C. of 20 mPa · s, commercially available from Allnex USA Inc. as EBECRYL 110; and |
| ACRYLATE F | an acrylated resin having having an OH value of 30 mg KOH/g and a viscosity @ 25° C. of 20 mPa · s, commercially available from Allnex USA Inc. as EBECRYL 152. |

Table I summarizes the coatings formulations prepared for the Examples along with theoretical results.

Table II summarizes aspartic ester functional amine and acrylate-containing compound formulations and Table III summarizes physical property measurements of those formulations. Additive amounts were based on blend (polyaspartates+acrylates). Pendulum hardness was measured immediately after UV cure and at 7 days following cure at UV 10 mils thickness draw down with a pendulum hardness device. Gasoline resistance or isopropyl alcohol (IPA) resistance was assessed at one hour by soaking a cotton ball in gasoline or IPA, placing the cotton ball on the coating surface and covering it with a watch glass. Viscosity measurements of a 300 g sample were made with a Brookfield viscometer to give an indication of pot-life.

TABLE I

| | Ex. I-A Weight | Ex. I-B Weight | Ex. I-C Weight | Ex. I-D Weight | Ex. I-E Weight | Ex. I-F Weight | Ex. I-G Weight |
|---|---|---|---|---|---|---|---|
| Component 1 | | | | | | | |
| POLYASPARTATE A | 0 | 0 | 0 | 0 | 0 | 0 | 0 |
| POLYASPARTATE B | 0 | 0 | 23.00 | 36.10 | 0 | 51.02 | 0 |
| POLYASPARTATE C | 56.82 | 45.99 | 23.00 | 0 | 49.44 | | 36.42 |
| ACRYLATE A | 0 | 19.71 | 19.71 | 36.10 | 12.36 | 12.76 | 15.61 |
| ACRYLATE B | 0 | 0 | 0 | 0 | 0 | 0 | 0 |
| PHOTOINTIATOR A | 0 | 0.79 | 0.79 | 1.81 | 0.49 | 0.51 | 0.62 |
| ADDITIVE A | 0.57 | 0.66 | 0.66 | 0.72 | 0.62 | 0.64 | 0.52 |
| ADDITIVE B | 0 | 0 | 0 | 0 | 0 | 0 | 0 |
| ADDITIVE C | 0 | 0 | 0 | 0 | 0 | 0 | 0 |
| Subtotal | 57.39 | 67.15 | 67.16 | 74.73 | 62.91 | 64.93 | 53.17 |
| Component 2 | | | | | | | |
| ISOCYANATE A | 42.61 | 32.85 | 32.85 | 25.27 | 37.08 | 35.08 | 46.83 |
| Subtotal | 42.61 | 32.85 | 32.85 | 25.27 | 37.08 | 35.08 | 46.83 |
| Total | 100 | 100 | 100 | 100 | 100 | 100 | 100 |
| Theoretical Results | | | | | | | |
| % NCO | 1.46 | 0.80 | 0.99 | 0.80 | 1.27 | 0.98 | 5.52 |
| Weight Solids | 99.46 | 99.38 | 99.38 | 99.31 | 99.41 | 99.39 | 99.51 |
| Wt/Gal | 9.13 | 8.99 | 8.99 | 8.88 | 9.04 | 9.02 | 9.11 |
| Volume Solids | 99.44 | 99.29 | 99.21 | 99.06 | 99.35 | 99.15 | 99.43 |
| Mix Ratio (volume) | 1.47:1 | 2.25:1 | 2.25:1 | 3.28:1 | 1.86:1 | 2.03:1 | 1.25:1 |
| VOC | 0.05 | 0.06 | 0.06 | 0.06 | 0.05 | 0.05 | 0.05 |
| NCO:OH | 1.17 | 1.12 | 1.15 | 1.16 | 1.17 | 1.13 | 2.01 |

| | Ex. I-H Weight | Ex. I-I Weight | Ex. I-J Weight | Ex. I-K Weight | Ex. I-L Weight | Ex. I-M Weight | Ex. I-N Weight |
|---|---|---|---|---|---|---|---|
| Component 1 | | | | | | | |
| POLYASPARTATE A | 18.40 | 13.83 | 0 | 0 | 5.98 | 8.21 | 5.98 |
| POLYASPARTATE B | 0 | 0 | 13.83 | 58.82 | 1.99 | 2.74 | 1.99 |
| POLYASPARTATE C | 18.40 | 27.66 | 27.66 | 0 | 27.94 | 38.36 | 27.94 |
| ACRYLATE A | 15.77 | 27.66 | 27.66 | 0 | 25.83 | 35.46 | 25.82 |
| ACRYLATE B | 0 | 0 | 0 | 0 | 11.09 | 15.22 | 11.09 |
| PHOTOINTIATOR A | 0.63 | 1.11 | 1.11 | 0 | 2.19 | 0 | 2.19 |
| ADDITIVE A | 0.53 | 0.69 | 0.69 | 0 | 0.40 | 0 | 0.25 |
| ADDITIVE B | 0 | 0 | 0 | 0 | 0.74 | 0 | 0.74 |
| ADDITIVE C | 0 | 0 | 0 | 0 | 0 | 0 | 0.16 |
| Subtotal | 53.73 | 70.95 | 70.95 | 58.82 | 76.16 | 100 | 76.16 |
| Component 2 | | | | | | | |
| ISOCYANATE A | 46.27 | 29.05 | 29.05 | 41.18 | 23.83 | 0 | 23.83 |
| Subtotal | 46.27 | 29.05 | 29.05 | 41.18 | 23.83 | 0 | 23.83 |
| Total | 100 | 100 | 100 | 100 | 100 | 100 | 100 |
| Theoretical Results | | | | | | | |
| % NCO | 5.48 | 0.81 | 0.91 | 1.27 | 0.44 | 0 | 0.44 |
| Weight Solids | 99.50 | 99.34 | 99.34 | 100.00 | 99.26 | 100.00 | 99.40 |
| Wt/Gal | 9.10 | 8.93 | 8.93 | 9.11 | 8.94 | 8.76 | 8.95 |
| Volume Solids | 99.36 | 99.14 | 99.09 | 100.00 | 99.05 | 100.03 | 99.24 |
| Mix Ratio (volume) | 1.28:1 | 2.70:1 | 2.70:1 | 1.56:1 | 3.50:1 | 0 | 3.50:1 |
| VOC | 0.05 | 0.06 | 0.06 | 0 | 0.07 | 0 | 0.05 |
| NCO:OH | 2.02 | 1.13 | 1.15 | 1.15 | 1.08 | 0 | 1.08 |

TABLE II

| Component | Ex. II-A Weight | Ex. II-B Weight | Ex. II-C Weight | Ex. II-D Weight | Ex. II-E Weight | Ex. II-F Weight | Ex. II-G Weight |
|---|---|---|---|---|---|---|---|
| POLYASPARTATE A | 17 | 17 | 17 | 17 | 17 | 17 | 17 |
| POLYASPARTATE B | 5 | 5 | 5 | 5 | 5 | 5 | 5 |
| POLYASPARTATE C | 78 | 78 | 78 | 78 | 78 | 78 | 78 |
| ACRYLATE A | 100 | | | | | | |
| ACRYLATE B | | 100 | | | | | |
| ACRYLATE C | | | 100 | | | | |
| ACRYLATE D | | | | 100 | | | |
| ACRYLATE E | | | | | 100 | | |
| ACRYLATE F | | | | | | 100 | |
| total | 200 | 200 | 200 | 200 | 200 | 200 | 100 |
| ADDITIVE F | 0.1% | 0.2% | | | | | |
| ADDITIVE D | | | 2% | | | | |
| ADDITIVE E | | | | 2% | | | |
| ADDITIVE C | | | | | | 0.2% | |

TABLE III

| | Ex. II-A | Ex. II-B | Ex. II-C | Ex. II-D | Ex. II-E | Ex. II-F | Ex. II-G |
|---|---|---|---|---|---|---|---|
| Physical Properties | | | | | | | |
| Pendulum Hardness (initial) | 57 sec. | 113 | 14 | 20 | 10 | 57 | 45 |
| Pendulum Hardness (7 days) | 71 | 106 | | 18 | 10 | 70 | 102 |
| IPA (1 hour exposure) | no effect | no effect | soft | soft | soft | no effect | soft |
| Gasoline (1 hour exposure) | no effect | no effect | soft | soft | soft | no effect | soft |
| Viscosity | | | | | | | |
| Initial | | 62 | 310 | 300 | 318 | 110 | 152 | 428 |
| 15 minutes | | 109 | 520 | 650 | 1000 | 200 | 322 | 900 |
| 30 minutes | | 166 | 1000 | 1350 | | 280 | 655 | |
| 45 minutes | | | | | | | 1200 | |
| 60 minutes | | 445 | | | | 680 | | |
| 90 minutes | | 800 | | | | 1200 | | |
| 120 minutes | | 1250 | | | | | | |
| Time (minutes) to 1000 cps. | 105 | 30 | 20 | 15 | 75 | 40 | 20 |

Figure 1:
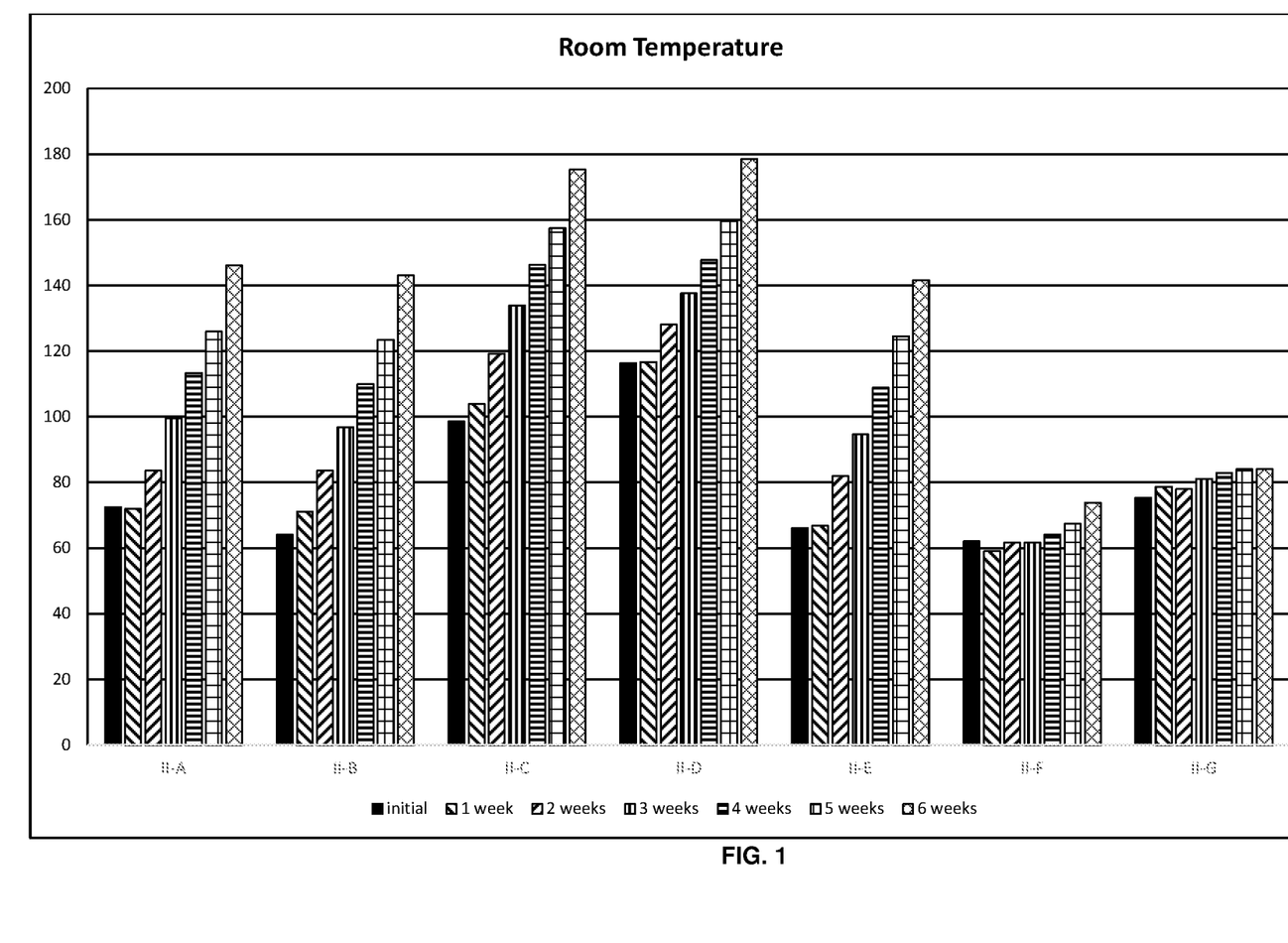
FIG. 1 shows discoloration of samples of aspartic ester functional amine and acrylate-containing compound blends over six weeks at room temperature measured according to ASTM D1209.
Figure 2:
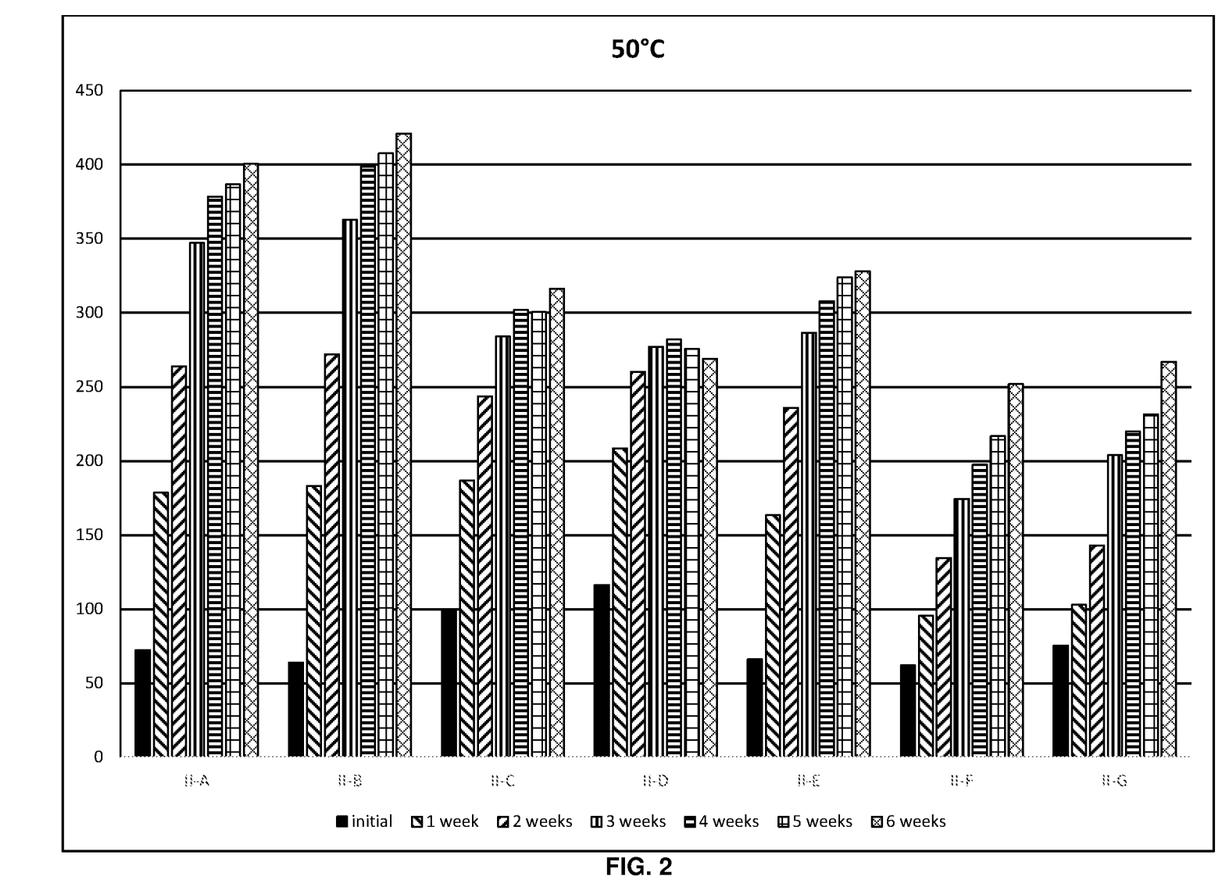
FIG. 2 illustrates discoloration of samples of aspartic ester functional amine and acrylate-containing compound blends over six weeks at 50° C. measured according to ASTM D1209.

Table IV summarizes the results of yellowness testing of the formulations at room temperature according to ASTM D1209. FIG. 1 provides a graphical depiction of this data. Table V summarizes the results of yellowness testing of the same formulations at 50° C. according to ASTM D1209. FIG. 2 provides a graphical depiction of this data.

TABLE IV

| | | | RT | | | | |
|---|---|---|---|---|---|---|---|
| | initial | 1 week | 2 weeks | 3 weeks | 4 weeks | 5 weeks | 6 weeks |
| II-A | 72.4 | 72 | 83.6 | 99.6 | 113.4 | 126 | 146.1 |
| II-B | 64 | 71.1 | 83.6 | 96.9 | 109.9 | 123.5 | 143.1 |
| II-C | 98.6 | 103.9 | 119.3 | 133.9 | 146.3 | 157.5 | 175.3 |
| II-D | 116.3 | 116.7 | 128.1 | 137.6 | 147.8 | 159.6 | 178.6 |
| II-E | 66.1 | 66.8 | 81.9 | 94.7 | 108.9 | 124.6 | 141.7 |
| II-F | 62.1 | 59.1 | 61.7 | 61.7 | 64.2 | 67.4 | 73.8 |
| II-G | 75.4 | 78.7 | 78 | 81.1 | 83 | 84.1 | 84.1 |

TABLE V

| | | | 50° C. | | | | |
|---|---|---|---|---|---|---|---|
| | initial | 1 week | 2 weeks | 3 weeks | 4 weeks | 5 weeks | 6 weeks |
| II-A | 72.4 | 178.8 | 264 | 347.3 | 378.5 | 386.9 | 400.7 |
| II-B | 64 | 183.4 | 272.1 | 362.8 | 398.8 | 407.8 | 421.1 |
| II-C | 98.6 | 187 | 243.9 | 284.1 | 302 | 300.8 | 316.3 |
| II-D | 116.3 | 208.6 | 260.2 | 277.2 | 282.1 | 275.8 | 269.1 |
| II-E | 66.1 | 163.6 | 236 | 286.6 | 307.9 | 324 | 328.2 |
| II-F | 62.1 | 95.7 | 134.6 | 174.4 | 197.6 | 216.9 | 252 |
| II-G | 75.4 | 103.1 | 143 | 204.1 | 220 | 231.7 | 267 |

In both FIGS., the initial measurements are shown as solid black bars; one week measurements are shown with downward diagonal patterns; two week measurements are shown with upward diagonal patterns; three week measurements are shown with vertical patterns; four weeks are shown with horizontal patterns; five weeks are shown with grid patterns; and six weeks are shown with diamond patterns.

As can be appreciated by reference FIGS. 1 and 2, formulation II-F containing 0.2% of the alkyl carbodiimide, N,N-dicyclohexylcarbodiimide, was consistent in showing the lowest amount of discoloration (i.e., yellowing) for each of the time periods at room temperature and at 50° C.

This specification has been written with reference to various non-limiting and non-exhaustive embodiments.

However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112(a), and 35 U.S.C. § 132(a).

Various aspects of the subject matter described herein are set out in the following numbered clauses:

1. A coating composition comprising: 1% to 99% of a blend of two or more aspartic ester functional amines; 20% to 70% of an acrylate-containing compound; 0.01% to 5% of an alkyl carbodiimide; 0.1% to 5% of a photoinitiator; and 20% to 70% of one or more polyisocyanates, wherein the coating composition has reduced discoloration compared to the composition without the alkyl carbodiimide.

2. The coating composition according to clause 1, wherein the alkyl carbodiimide is a dialkyl carbodiimide.

3. The coating composition according to clause 2, wherein the dialkyl carbodiimide is selected from the group consisting of diisopropylcarbodiimide and dicyclohexyl carbodiimide.

4. The coating composition according to one of clauses 2 and 3, wherein the dialkyl carbodiimide is dicyclohexyl carbodiimide.

5. The coating composition according to any one of clauses 1 to 4, wherein the alkyl carbodiimide is present in an amount of 0.2%.

6. The coating composition according to one of clauses 1 to and 5, wherein the acrylate-containing compound has a functionality of 2 or more.

7. The coating composition according to any one of clauses 1 to 6, wherein the acrylate-containing compound has a functionality of 3 or more.

8. The coating composition according to any one of clauses 1 to 7, wherein the acrylate-containing compound is selected from the group consisting of 1,6 hexanediol diacrylate, pentaerythritol $(EO)_n$ tetraacrylate, isobornyl acrylate, tripropylene glycol diacrylate, and trimethylolpropane triacrylate.

9. The coating composition according to any one of clauses 1 to 8, wherein the acrylate-containing compound is trimethylolpropane triacrylate.

10. The coating composition according to any one of clauses 1 to 9, wherein the photoinitiator is selected from the group consisting of acylphosphine oxide derivatives, α-aminoalkylphenone derivatives, hydroxyalkylphenones, benzophenones, benzil ketals, methylbenzoyl formate, and phenylacetophenones.

11. The coating composition according to any one of clauses 1 to 10, wherein the photoinitiator is a 50/50 mixture of 1-hydroxy-cyclohexyl-phenyl-ketone and benzophenone.

12. The coating composition according to any one of clauses 1 to 11, wherein the polyisocyanate is selected from the group consisting of ethylene diisocyanate; 1,4-tetramethylene diisocyanate, 1,6-hexamethylene diisocyanate (HDI), pentamethylene diisocyanate (PDI), isophorone diisocyanate (IPDI), 2,2,4- and 2,4,4-trimethyl-hexamethylene diisocyanate, the isomeric bis-(4,4'-isocyanatocyclohexyl) methanes or mixtures thereof of any desired isomer content, benzene diisocyanate; 1,4-cyclohexylene diisocyanate, 1,12-dodecamethylene diisocyanate, 1,4-phenylene diisocyanate, 2,4- and/or 2,6-toluene diisocyanate (TDI) or hydrogenated 2,4- and/or 2,6-toluene diisocyanate, 1,5-naphthalene diisocyanate, 2,4'- and 4,4'-diphenylmethane diisocyanate (MDI), 1,3- and 1,4-bis-(2-isocyanato-prop-2-yl)-benzene (TMXDI), 1,3-bis(isocyanato-methyl)benzene (XDI), bis-(4-isocyanato-cyclohexyl)methane ($H_{12}$MDI), (S)-alkyl 2,6-diisocyanato-hexanoates, (L)-alkyl 2,6-diisocyanatohexanoates. and mixtures thereof.

13. The coating composition according to any one of clauses 1 to 12, wherein the polyisocyanate is hexamethylene diisocyanate.

14. The coating composition according to any one of clauses 1 to 13, wherein the discoloration is yellowing.

15. A substrate coated with the coating composition according to any one of clauses 1 to 14.

16. The substrate according to clause 15, wherein the substrate is selected from the group consisting of countertops and floors.

17. The substrate according to one of clauses 15 and 16, wherein the coating composition is cured by exposure to actinic radiation.

18. A cured coating produced by exposing to actinic radiation a coating composition comprising 1% to 99% of a blend of two or more aspartic ester functional amines; 20% to 70% of an acrylate-containing compound; 0.01% to 5% of an alkyl carbodiimide; 0.1% to 5% of a photoinitiator; and 20% to 70% of one or more polyisocyanates, wherein the coating composition has reduced discoloration compared to the composition without the alkyl carbodiimide.

19. The cured coating according to clause 18, wherein the alkyl carbodiimide is a dialkyl carbodiimide.

20. The cured coating according to clause 19, wherein the dialkyl carbodiimide is selected from the group consisting of diisopropylcarbodiimide and dicyclohexyl carbodiimide.

21. The cured coating according to one of clauses 19 and 20, wherein the dialkyl carbodiimide is dicyclohexyl carbodiimide.

22. The cured coating according to any one of clauses 19 to 21, wherein the alkyl carbodiimide is present in an amount of 0.2%.

23. The cured coating according to one of clauses any one of clauses 19 to 22, wherein the acrylate-containing compound has a functionality of 2 or more.

24. The cured coating according to any one of clauses 18 to 23, wherein the acrylate-containing compound has a functionality of 3 or more.

25. The cured coating according to any one of clauses 18 to 24, wherein the acrylate-containing compound is selected from the group consisting of 1,6 hexanediol diacrylate, pentaerythritol $(EO)_n$ tetraacrylate, isobornyl acrylate, tripropylene glycol diacrylate, and trimethylolpropane triacrylate.

26. The cured coating according to any one of clauses 18 to 25, wherein the acrylate-containing compound is trimethylolpropane triacrylate.

27. The cured coating according to any one of clauses 18 to 26, wherein the photoinitiator is selected from the group consisting of acylphosphine oxide derivatives, α-aminoalkylphenone derivatives, hydroxyalkylphenones, benzophenones, benzil ketals, methylbenzoyl formate, and phenylacetophenones.

28. The cured coating according to any one of clauses 18 to 27, wherein the photoinitiator is a 50/50 mixture of 1-hydroxy-cyclohexyl-phenyl-ketone and benzophenone.

29. The cured coating according to any one of clauses 18 to 28, wherein the polyisocyanate is selected from the group consisting of ethylene diisocyanate; 1,4-tetramethylene diisocyanate, 1,6-hexamethylene diisocyanate (HDI), pentamethylene diisocyanate (PDI), isophorone diisocyanate (IPDI), 2,2,4- and 2,4,4-trimethyl-hexamethylene diisocyanate, the isomeric bis-(4,4'-isocyanatocyclohexyl)methanes or mixtures thereof of any desired isomer content, benzene diisocyanate; 1,4-cyclohexylene diisocyanate, 1,12-dodecamethylene diisocyanate, 1,4-phenylene diisocyanate, 2,4- and/or 2,6-toluene diisocyanate (TDI) or hydrogenated 2,4- and/or 2,6-toluene diisocyanate, 1,5-naphthalene diisocyanate, 2,4'- and 4,4'-diphenylmethane diisocyanate (MDI), 1,3- and 1,4-bis-(2-isocyanato-prop-2-yl)-benzene (TMXDI), 1,3-bis(isocyanato-methyl)benzene (XDI), bis-(4-isocyanato-cyclohexyl)methane ($H_{12}$MDI), (S)-alkyl 2,6-diisocyanato-hexanoates, (L)-alkyl 2,6-diisocyanatohexanoates. and mixtures thereof.

30. The cured coating according to any one of clauses 18 to 29, wherein the polyisocyanate is hexamethylene diisocyanate.

31. The cured coating according to any one of clauses 18 to 30, wherein the discoloration is yellowing.

32. A process of reducing discoloration of a coating composition comprising adding an alkyl carbodiimide to the composition.

33. The process according to clause 32, wherein the alkyl carbodiimide alkyl carbodiimide is a dialkyl carbodiimide.

34. The process according to clause 33, wherein the dialkyl carbodiimide is selected from the group consisting of diisopropylcarbodiimide and dicyclohexyl carbodiimide.

35. The process according to one of clauses 33 and 34, wherein the dialkyl carbodiimide is a dicyclohexyl carbodiimide.

36. The process according to one of clauses 34 and 35, wherein the dicyclohexyl carbodiimide is present in an amount of 0.2%.

37. The process according to any one of clauses 32 to 36, wherein the alkyl carbodiimide is present in an amount of 0.01% to 5%.

38. The process according to any one of clauses 32 to 37, wherein the discoloration is yellowing.

39. A process of reducing discoloration of a coating composition comprising adding 0.01% to 5% of an alkyl carbodiimide to the coating composition, wherein the coating composition comprises 1% to 99% of a blend of two or more aspartic ester functional amines; 20% to 70% of an acrylate-containing compound; 0.1% to 5% of a photoinitiator; and 20% to 70% of one or more polyisocyanates.

40. The process according to clause 39, wherein the alkyl carbodiimide alkyl carbodiimide is a dialkyl carbodiimide.

41. The process according to clause 40, wherein the dialkyl carbodiimide is selected from the group consisting of diisopropylcarbodiimide and dicyclohexyl carbodiimide.

42. The process according to one of clauses 40 and 41, wherein the dialkyl carbodiimide is a dicyclohexyl carbodiimide.

43. The process according to one of clauses 41 and 42, wherein the dicyclohexyl carbodiimide is present in an amount of 0.2%.

44. The process according to any one of clauses 39 to 43, wherein the discoloration is yellowing.

What is claimed is:
1. A coating composition comprising:
1% to 99% of a blend of two or more aspartic ester functional amines;
20% to 70% of an acrylate-containing compound;
0.01% to 5% of an alkyl carbodiimide;
0.1% to 5% of a photoinitiator; and
20% to 70% of one or more polyisocyanates,
wherein the coating composition has reduced discoloration compared to the composition without the alkyl carbodiimide.

2. The coating composition according to claim 1, wherein the alkyl carbodiimide is a dialkyl carbodiimide.

3. The coating composition according to claim 1, wherein the alkyl carbodiimide is dicyclohexylcarbodiimide (DCC).

4. The coating composition according to claim 1, wherein the alkyl carbodiimide is present in an amount of 0.2%.

5. The coating composition according to claim 1, wherein the acrylate-containing compound is selected from the group consisting of 1,6 hexanediol diacrylate, pentaerythritol (EO)$_n$ tetraacrylate, isobornyl acrylate, tripropylene glycol diacrylate, and trimethylolpropane triacrylate.

6. The coating composition according to claim 1, wherein the photoinitiator is selected from the group consisting of acylphosphine oxide derivatives, α-aminoalkylphenone derivatives, hydroxyalkylphenones, benzophenones, benzil ketals, methylbenzoyl formate, and phenylacetophenones.

7. The coating composition according to claim 1, wherein the photoinitiator is a 50/50 mixture of 1-hydroxy-cyclohexyl-phenyl-ketone and benzophenone.

8. The coating composition according to claim 1, wherein the polyisocyanate is selected from the group consisting of ethylene diisocyanate; 1,4-tetramethylene diisocyanate, 1,6-hexamethylene diisocyanate (HDI), pentamethylene diisocyanate (PDI), isophorone diisocyanate (IPDI), 2,2,4- and 2,4,4-trimethyl-hexamethylene diisocyanate, the isomeric bis-(4,4'-isocyanatocyclohexyl)methanes or mixtures thereof of any desired isomer content, benzene diisocyanate; 1,4-cyclohexylene diisocyanate, 1,12-dodecamethylene diisocyanate, 1,4-phenylene diisocyanate, 2,4- and/or 2,6-toluene diisocyanate (TDI) or hydrogenated 2,4- and/or 2,6-toluene diisocyanate, 1,5-naphthalene diisocyanate, 2,4'- and 4,4'-diphenylmethane diisocyanate (MDI), 1,3- and 1,4-bis-(2-isocyanato-prop-2-yl)-benzene (TMXDI), 1,3-bis (isocyanato-methyl)benzene (XDI), bis-(4-isocyanato-cyclohexyl)methane ($H_{12}$MDI), (S)-alkyl 2,6-diisocyanatohexanoates, (L)-alkyl 2,6-diisocyanatohexanoates, and mixtures thereof.

9. The coating composition according to claim 1, wherein the discoloration is yellowing.

10. A substrate coated with the coating composition according to claim 1.

11. The substrate according to claim 10, wherein the substrate is selected from the group consisting of countertops and floors.

12. A cured coating produced by exposing to actinic radiation a coating composition comprising 1% to 99% of a blend of two or more aspartic ester functional amines; 20% to 70% of an acrylate-containing compound; 0.01% to 5% of an alkyl carbodiimide; 0.1% to 5% of a photoinitiator; and 20% to 70% of one or more polyisocyanates, wherein the coating composition has reduced discoloration compared to the composition without the alkyl carbodiimide.

13. The cured coating according to claim 12, wherein the alkyl carbodiimide is a dialkyl carbodiimide.

14. The cured coating according to claim 13, wherein the dialkyl carbodiimide is selected from the group consisting of diisopropylcarbodiimide and dicyclohexylcarbodiimide.

15. The cured coating according to claim 12, wherein the alkyl carbodiimide is present in an amount of 0.2%.

16. The cured coating according to claim 12, wherein the acrylate-containing compound is selected from the group consisting of 1,6 hexanediol diacrylate, pentaerythritol (EO)$_n$ tetraacrylate, isobornyl acrylate, tripropylene glycol diacrylate, and trimethylolpropane triacrylate.

17. The cured coating according to claim 12, wherein the photoinitiator is selected from the group consisting of acylphosphine oxide derivatives, α-aminoalkylphenone derivatives, hydroxyalkylphenones, benzophenones, benzil ketals, methylbenzoyl formate, and phenylacetophenones.

18. The cured coating according to claim 12, wherein the photoinitiator is a 50/50 mixture of 1-hydroxy-cyclohexyl-phenyl-ketone and benzophenone.

19. The cured coating according to claim 12, wherein the polyisocyanate is selected from the group consisting of ethylene diisocyanate; 1,4-tetramethylene diisocyanate, 1,6-hexamethylene diisocyanate (HDI), pentamethylene diisocyanate (PDI), isophorone diisocyanate (IPDI), 2,2,4- and 2,4,4-trimethyl-hexamethylene diisocyanate, the isomeric bis-(4,4'-isocyanatocyclohexyl)methanes or mixtures thereof of any desired isomer content, benzene diisocyanate; 1,4-cyclohexylene diisocyanate, 1,12-dodecamethylene diisocyanate, 1,4-phenylene diisocyanate, 2,4- and/or 2,6-toluene diisocyanate (TDI) or hydrogenated 2,4- and/or 2,6-toluene diisocyanate, 1,5-naphthalene diisocyanate, 2,4'- and 4,4'-diphenylmethane diisocyanate (MDI), 1,3- and 1,4-bis-(2-isocyanato-prop-2-yl)-benzene (TMXDI), 1,3-bis (isocyanato-methyl)benzene (XDI), bis-(4-isocyanato-cyclohexyl)methane (H$_{12}$MDI), (S)-alkyl 2,6-diisocyanatohexanoates, (L)-alkyl 2,6-diisocyanatohexanoates, and mixtures thereof.

20. The cured coating according to claim 12, wherein the discoloration is yellowing.

21. A process of reducing discoloration of a coating composition comprising: adding an alkyl carbodiimide to the composition, wherein the coating composition comprises 1% to 99% of a blend of two or more aspartic ester functional amines; 20% to 70% of an acrylate-containing compound; 0.1% to 5% of a photoinitiator; and 20% to 70% of one or more polyisocyanates.

22. The process according to claim 21 wherein the alkyl carbodiimide is selected from the group consisting of diisopropylcarbodiimide and dicyclohexylcarbodiimide.

23. The process according to claim 21, wherein the alkyl carbodiimide is present in an amount of 0.01% to 5%.

24. The process according to claim 21, wherein the alkyl carbodiimide is present in an amount of 0.2%.

25. The process according to claim 21, wherein the discoloration is yellowing.

* * * * *